(12) United States Patent
Vuk

(10) Patent No.: US 7,891,185 B2
(45) Date of Patent: Feb. 22, 2011

(54) TURBO-GENERATOR CONTROL WITH VARIABLE VALVE ACTUATION

(75) Inventor: Carl T. Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 665 days.

(21) Appl. No.: 11/840,555

(22) Filed: Aug. 17, 2007

(65) Prior Publication Data

US 2009/0045629 A1 Feb. 19, 2009

(51) Int. Cl.
*F02B 33/44* (2006.01)
*F02B 47/08* (2006.01)
*F01D 15/10* (2006.01)

(52) U.S. Cl. ............... 60/608; 60/605.2; 123/568.21; 290/52

(58) Field of Classification Search ............... 290/1 A, 290/52, 40 B; 60/608, 605.2, 611, 602; 123/568.21, 123/698
See application file for complete search history.

(56) References Cited

U.S. PATENT DOCUMENTS

| | | | | |
|---|---|---|---|---|
| 3,998,058 A | * | 12/1976 | Park | 60/652 |
| 4,442,665 A | * | 4/1984 | Fick et al. | 60/39.12 |
| 4,940,029 A | * | 7/1990 | Rees | 123/257 |
| 4,958,497 A | * | 9/1990 | Kawamura | 60/608 |
| 5,201,181 A | * | 4/1993 | Ohmori et al. | 60/737 |
| 6,604,360 B1 | | 8/2003 | Vuk | 60/597 |
| 7,047,743 B1 | * | 5/2006 | Stahlhut et al. | 60/608 |
| 7,152,393 B2 | * | 12/2006 | Hergemoller et al. | 60/280 |
| 2003/0029390 A1 | * | 2/2003 | Campion | 123/2 |
| 2003/0127079 A1 | * | 7/2003 | Onodera et al. | 123/568.21 |
| 2004/0222640 A1 | * | 11/2004 | McKelvey et al. | 290/7 |
| 2006/0162335 A1 | | 7/2006 | Vuk | 60/612 |
| 2007/0120368 A1 | * | 5/2007 | Baarman et al. | 290/43 |
| 2007/0234721 A1 | | 10/2007 | Vuk | 60/608 |

FOREIGN PATENT DOCUMENTS

DE 3705310 A1 * 9/1988

* cited by examiner

*Primary Examiner*—Julio Gonzalez
(74) *Attorney, Agent, or Firm*—Taylor IP

(57) ABSTRACT

An internal combustion engine incorporating a turbo-generator and one or more variably activated exhaust valves. The exhaust valves are adapted to variably release exhaust gases from a combustion cylinder during a combustion cycle to an exhaust system. The turbo-generator is adapted to receive exhaust gases from the exhaust system and rotationally harness energy therefrom to produce electrical power. A controller is adapted to command the exhaust valve to variably open in response to a desired output for the turbo-generator.

4 Claims, 2 Drawing Sheets

TURBO-GENERATOR CONTROL WITH VARIABLE VALVE ACTUATION

This invention was made with Government support under contract DE-FC26-05NT42422 awarded by the Department of Energy. The United States Government has certain rights in this invention

FIELD OF THE INVENTION

The present invention related to control of an internal combustion engine having a turbo-generator, and more specifically, to the allocation of combustion energy between the engine and turbo-generator.

BACKGROUND OF THE INVENTION

Internal combustion (IC) engines are widely used to provide mechanical power in mobile and stationary applications. It is common for engines to use turbochargers to harness residual energy from the engine exhaust gases with a turbine driving a compressor to boost airflow to the engine. It is also known to use a power-turbine to harness additional mechanical power, or to drive an electrical generator. The later configuration is known as a turbo-generator.

Traditionally, turbochargers and turbo-generators were employed as a way of extracting waste energy that was otherwise released to the atmosphere, thereby improving the overall efficiency of the power unit. However, the control strategies employed with these power units focus primarily on the output of the internal combustion engine, with output of the turbo systems subject to the default amount of energy available in the exhaust gases. However, this strategy leaves turbo-generator systems unable to provide consistent electrical power to meet demand. In some cases it is more energy efficient to expand the cylinder gases from late in the expansion stroke with the turbine since it has a larger expansion ratio.

SUMMARY OF THE INVENTION

Described herein is a system for controlling the output of an IC engine incorporating a turbo-generator. The system employs variable valve actuation (VVA) technology to variably adjust the exhaust valve timing to begin opening at points within the expansion stroke of the IC engine combustion cycle. The early release of exhaust gases allocates additional energy to the turbo-generator in order to meet changing electrical loads.

DETAILED DESCRIPTION OF THE INVENTION

Figure 1:
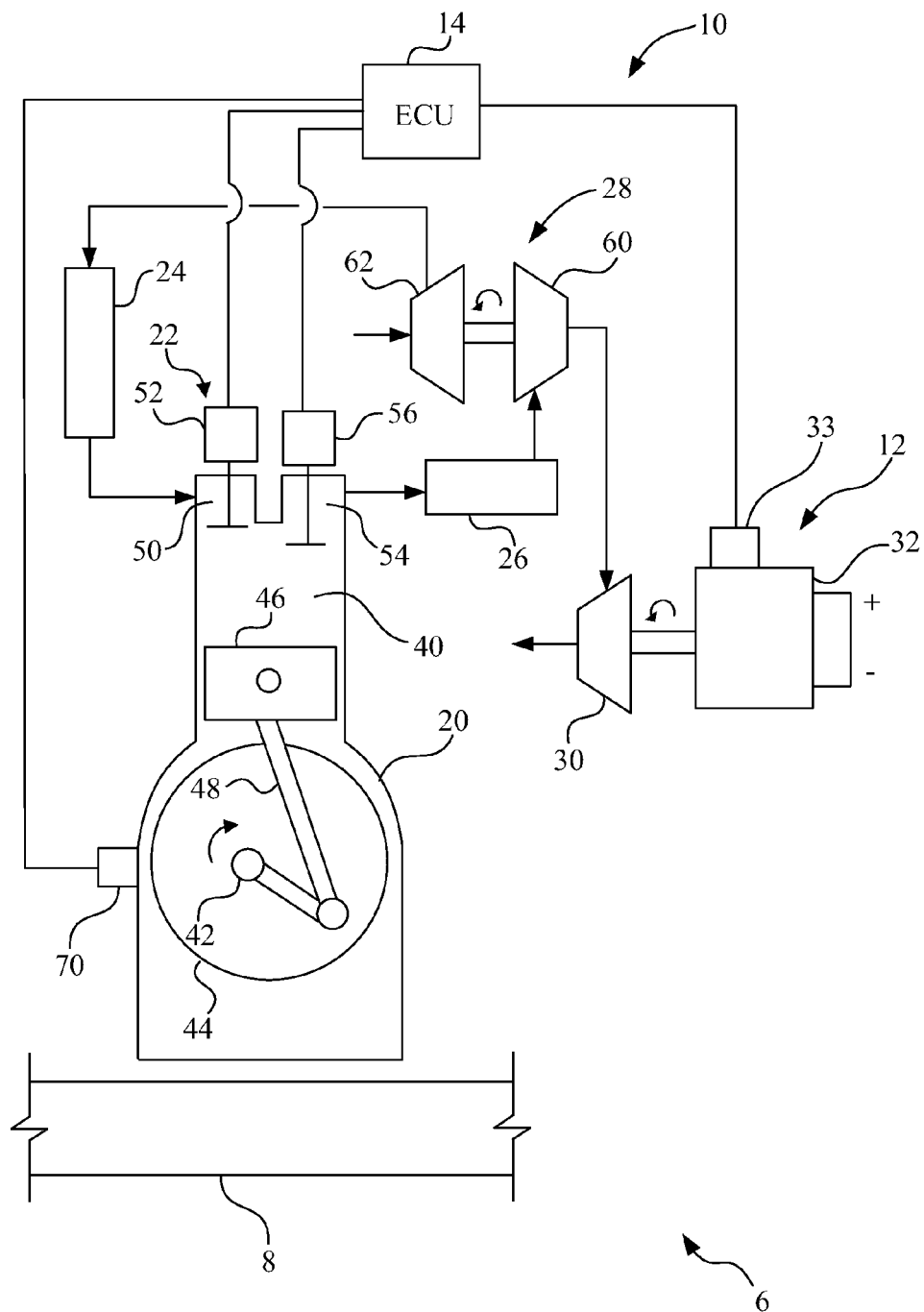
FIG. 1 is a schematic illustration showing an embodiment of an internal combustion engine of the present invention having a turbo-generator developing electrical power.

Referring now to the drawings, and more particularly to FIG. 1, there is shown a portion of a power unit 6 including a frame 8 which carries an IC engine 10. Power unit 6 can be in the form of a work vehicle such as an agricultural or construction tractor, or an electrical generator set. Thus, it should be clear that the desired output from power unit 6 can be either mechanical or electrical power.

IC engine 10 includes a turbo-generator 12 developing electrical power, and an electronic controller unit (ECU) 14 for monitoring and controlling the engine 10. The engine 10 includes a cylinder block 20, a cylinder head 22, an intake system 24, an exhaust system 26, and a turbocharger 28. The turbo-generator 12 includes a power-turbine 30 coupled to an electrical generator 32. The engine 10 develops mechanical power under combustion cycles generally known in the art, while the turbo-generator 12 and turbocharger 28 harness residual energy from the engine exhaust system 26 under turbine cycles generally known in the art.

The cylinder block 20 includes one or more combustion cylinders 40 and a crankshaft 42 coupled to a flywheel 44. A piston 46 slides within each cylinder 40, to transmit energy from the combustion cycle to the crankshaft 42 via a connecting rod 48. The cylinder head 22 includes intake ports 50 that channel intake air from the intake system 24 into each cylinder 40 via one or more intake valves 52. The cylinder head 22 also includes exhaust ports 54 that channel exhaust gases from each cylinder 40 into the exhaust system 26 via one or more exhaust valves 56. The turbocharger 28 includes a power-turbine 60 that is placed downstream of the exhaust system 26, coupled via a rotating drive shaft with a compressor 62 that is placed upstream of the intake system 28. The power turbine 60 harnesses waste energy from the engine exhaust system 26 in order to boost airflow in the intake system 28.

The ECU 14 may take the form of any combination of electronic hardware and/or software typical in the art for monitoring and controlling engine 10 and vehicles systems. In this embodiment, the ECU 14 monitors a crankshaft sensor 70 indicating crank-angle or rotational speed of the crankshaft 42, and a turbo-generator output sensor 33 indicating rotational speed or electrical current of the turbo-generator 12. The ECU 14 normally controls the timing and quantity of fuel delivered to each combustion cylinder 40. In this embodiment, the ECU 14 also controls the timing and duration of the intake valve 52 and the exhaust valve 56 with VVA technology that has recently become known in the art.

Figure 2:
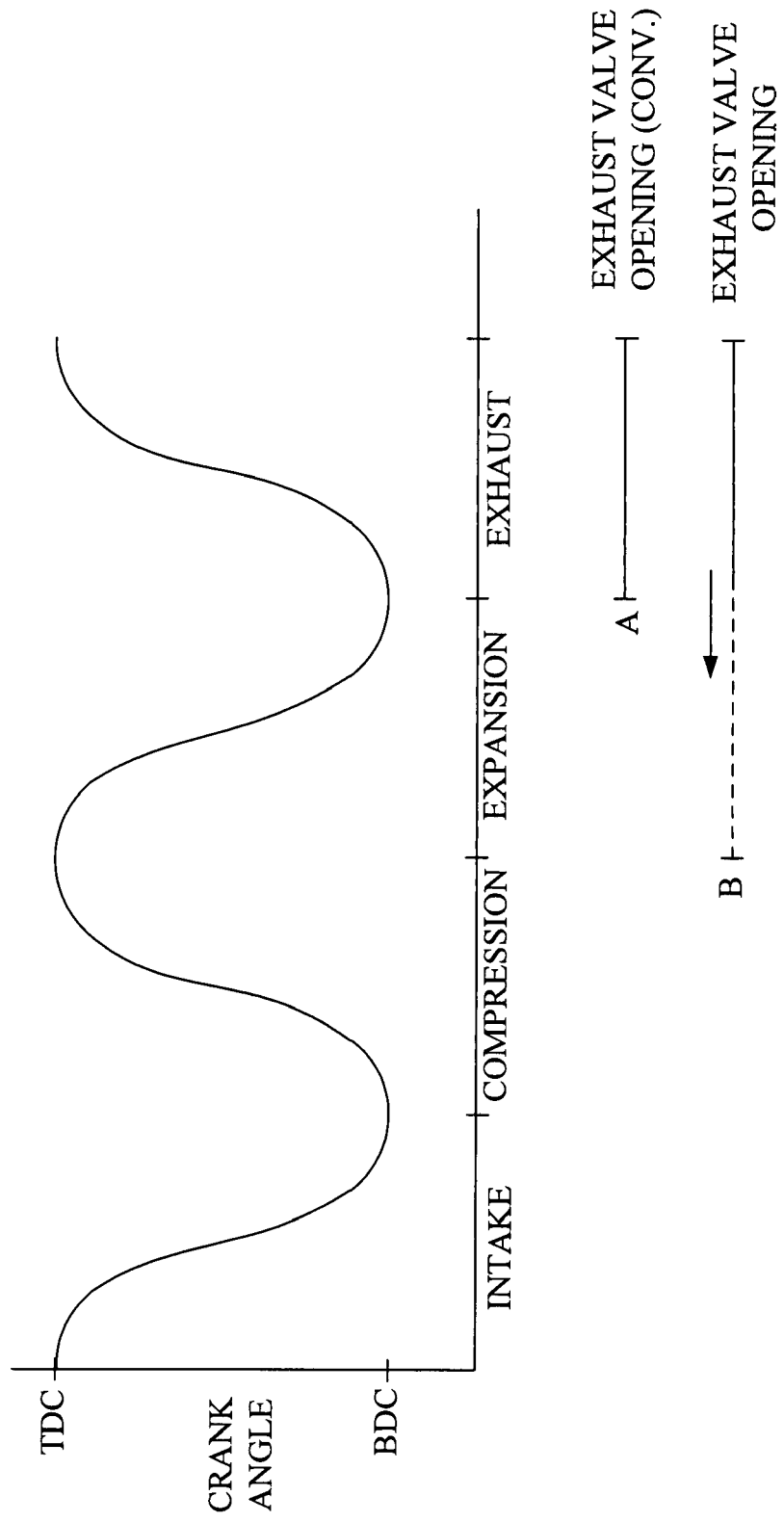
FIG. 2 is a graphical illustration showing a shift in time for the exhaust valve opening using the present invention.

Referring now to FIG. 2, during normal operation of the engine 10, fuel and intake air is compressed and ignited within the cylinder 40 when the piston 46 is at or near the top of the cylinder 40. The combustion releases energy, increasing temperature and pressure within the cylinder 40. This in turn forces the piston 46 downward, transferring mechanical power to the crankshaft 42 in what is commonly called the expansion or power stroke. This process continues until the piston 46 reaches the bottom of the cylinder 40, at which point the ECU 14 senses the crank-angle in the combustion cycle and commands the exhaust valve 56 to open at the beginning of the exhaust stroke (line A in FIG. 2). The piston 46 then begins to travel upward in the cylinder 40 due to the momentum of the flywheel 44, forcing the exhaust gases from the cylinder 40 into the exhaust system 26 in what is commonly called the exhaust stoke. This process continues until the piston 46 reaches the top of the cylinder 40, at which point the ECU 14 senses the crank-angle in the combustion cycle and commands the exhaust valve 56 to close (at the right of line A). The four stroke combustion cycle then repeats in known manner.

Once in the exhaust system 26, the residual energy of the exhaust gas is available for the turbocharger 28 and turbo-generator 12 to harness for additional work. According to an aspect of the present invention, to increase this residual energy, and thereby provide for greater electrical output from the turbo-generator 12, the ECU 14 is adapted to command the exhaust valve 56 to begin opening earlier than normal, at some point during and before the end of the expansion stroke (as shown by the dashed line portion of line B in FIG. 2). In one embodiment, a desired rotational speed for the turbo-generator 12 is determined from an output signal from speed sensor 33, preferably within a range at which the turbo-generator 12 is most efficient at harnessing residual energy from the exhaust system 26. The ECU 14 then monitors the speed of the turbo-generator 12 for deviation from the desired speed, and adjusts the timing of the exhaust valve 56 to increase or reduce the residual energy available.

For example, when the turbo-generator 12 is under little to no electrical load, the exhaust valve 56 is commanded to begin opening normally at or near the beginning of the exhaust stroke. As electrical load increases above turbo generator output, the voltage drops. ECU 14 senses the voltage drop, and commands the exhaust valve 56 to begin opening progressively earlier in the expansion stroke, advancing the timing until the residual energy in the exhaust system 26 increases to a point where the turbo-generator 12 is able to attain the desired voltage. Conversely, as electrical load decreases, the ECU 14 senses the voltage of the turbo-generator 12 increasing, and will command the exhaust valve 56 to begin opening progressively later in the expansion stroke, retarding the timing until the residual energy in the exhaust system 26 is reduced to a point where the turbo-generator 12 is able to attain the desired speed.

During the foregoing events, where the ECU 14 is commanding the opening of the exhaust valve 56 to compensate for variable electrical load on the turbo-generator 12, power output of the engine 10 is preferably regulated by the ECU 14 with a governed-speed algorithm commonly known in the art. In one embodiment of this algorithm, a desired speed for the crankshaft 42 is determined, usually from a sloping governor curve that is defined by an initial speed command selected by an operator. The ECU 14 then monitors the speed of the crankshaft 42 for deviation from the desired speed, and adjusts fuel quantity and timing to increase or reduce the mechanical power output of the engine 10 until the desired speed is attained.

Several additional embodiments of the foregoing system will be apparent to one of ordinary skill in the art. For example, the combustion cycle could be a 2-stroke or 4-stroke cycle, or of an Otto or Diesel type. The engine 10 may be of a port injected, directed injected, or spark ignited configuration, or any combination thereof. The intake system 24 may include an intake manifold, a throttle valve, a charge air cooler, an EGR valve, and so forth. The exhaust system 26 may include an exhaust manifold, an EGR passage, an EGR cooler, and so on. Furthermore, the turbocharger 28 may be of a fixed geometry type, a variable geometry type (VGT), or equipped with a wastegate bypass valve.

Having described the preferred embodiment, it will become apparent that various modifications can be made without departing from the scope of the invention as defined in the accompanying claims.

The invention claimed is:

1. An internal combustion engine comprising:
   a controllable exhaust valve variably releasing exhaust gases from an individual combustion cylinder during a combustion cycle to an exhaust system on a cycle to cycle basis;
   a turbo-generator receiving exhaust gases from the exhaust system and rotationally harnessing energy therefrom to produce electrical power; and
   a controller adapted to command the exhaust valve to variably open in response to a desired output for the turbo-generator, wherein the controller is adapted to open the exhaust valve progressively earlier in the combustion cycle when more turbo-generator output is desired, and to open the exhaust valve progressively later when less turbo-generator output is desired.

2. An internal combustion engine comprising:
   a controllable exhaust valve variably releasing exhaust gases from an individual combustion cylinder during a combustion cycle to an exhaust system on a cycle to cycle basis;
   a turbo-generator receiving exhaust gases from the exhaust system and rotationally harnessing energy therefrom to produce electrical power;
   a controller adapted to command the exhaust valve to variably open in response to a desired output for the turbo-generator; and
   a sensor to indicate turbo generator DC output voltage, and wherein the desired turbo-generator output is the power required to maintain a desired DC output voltage, wherein the controller is adapted to open the exhaust valve progressively earlier in the combustion cycle when turbo-generator voltage is below the desired level, and to open the exhaust valve progressively later when turbo-generator voltage is above the desired level.

3. A power unit, comprising:
   a frame; and
   an internal combustion engine carried by said frame, said internal combustion engine including:
      a controllable exhaust valve variably releasing exhaust gases from an individual combustion cylinder during a combustion cycle to an exhaust system on a cycle to cycle basis;
      a turbo-generator receiving exhaust gases from the exhaust system and rotationally harnessing energy therefrom to produce electrical power;
      a controller adapted to command the exhaust valve to variably open in response to a desired output for the turbo-generator, and
   wherein the controller is adapted to open the exhaust valve progressively earlier in the combustion cycle when more turbo-generator output is desired, and to open the exhaust valve progressively later when less turbo-generator output is desired.

4. The power unit of claim 3, wherein said power unit comprises one of a work machine and an electrical generator set.

* * * * *